United States Patent
Guerrero, Jr. et al.

(10) Patent No.: US 6,952,748 B1
(45) Date of Patent: Oct. 4, 2005

(54) VOLTAGE REQUEST ARBITER

(75) Inventors: Edward C. Guerrero, Jr., Austin, TX (US); Jamie Juarez, Austin, TX (US); John David Schell, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 628 days.

(21) Appl. No.: 09/753,867

(22) Filed: Jan. 2, 2001

(51) Int. Cl.[7] .......................... G06F 13/36; G06F 1/26
(52) U.S. Cl. ..................... 710/113; 713/300
(58) Field of Search ................. 710/113; 713/300, 713/310; 327/72, 77, 63; 307/52, 65, 40, 307/29, 41; 219/506, 486

(56) References Cited

U.S. PATENT DOCUMENTS

| | | | | |
|---|---|---|---|---|
| 4,998,027 A | | 3/1991 | Mihara et al. | |
| 5,079,410 A | * | 1/1992 | Payne et al. | 219/506 |
| 5,343,086 A | * | 8/1994 | Fung et al. | 327/63 |
| 5,534,801 A | * | 7/1996 | Wu et al. | 327/72 |
| 6,137,188 A | * | 10/2000 | Mitchell et al. | 307/29 |
| 6,448,672 B1 | * | 9/2002 | Voegeli et al. | 307/52 |

* cited by examiner

Primary Examiner—Khanh Dang
(74) Attorney, Agent, or Firm—Robert C. Kowert; Meyertons, Hood, Kivlin, Kowert & Goetzel, P.C.

(57) ABSTRACT

Various embodiments of a circuit and method for arbitrating voltage requests in a computer system are disclosed. In a first embodiment, one or more devices in a computer system assert a plurality of voltage requests. These voltage requests are received by an arbiter which outputs a single voltage request. The outputted voltage request is received by one or more power supplies configured to supply a voltage to the devices. In this way, the devices all receive the same voltage even if they originally requested different voltages. In some embodiments, the arbiter may output a voltage request that is selected from the voltage requests asserted by the devices.

37 Claims, 7 Drawing Sheets

VOLTAGE REQUEST ARBITER

BACKGROUND OF THE INVENTION

1. Field of the Invention

This invention relates to computer system and, more particularly, to arbitrating a plurality of voltage requests in a computer system.

2. Description of the Related Art

As processors become faster and provide additional features, they tend to consume more power. Increased power consumption is undesirable for several reasons. For example, as computer use becomes more prevalent, the overall societal cost of powering all of these computers increases. On a more individual level, increased power consumption is also undesirable. In all computer applications, increased power consumption leads to increased operating costs. In battery-operated notebook computers, increased power usage decreases the life of the batteries.

Another undesirable consequence of increased power consumption is increased heat generation. As computer systems and the devices within computer systems consume more power, they generate more heat. This additional heat makes heat-related problems such as system crashes, lockups, random reboots, memory errors and damage to the internal devices more likely. In order to minimize these disadvantages and heat-related problems, computer system designers have attempted to reduce power consumption. Some computer designers have tried to reduce power consumed by individual components such as processors. However, this has led to many disparate power specifications. For example, early processors operated at the same voltage, which was typically 5 volts. Now, as processors are designed to have ever-decreasing power consumption, new processors may require different voltages than their predecessors and competitors. Additionally, newer processors may use split rail designs, requiring two different voltage levels: one for the external or I/O voltage and another for the internal or core voltage. For example, a split rail processor might require 3.3 V for its I/O voltage while requiring a lower core voltage of 2.9 V. In some systems, some components including the processor may operate at one voltage level, and other components, such as I/O components, may operate at another voltage level. Also, a manufacturer may offer different versions of a processor that operate at different voltage levels.

The various voltages that might be required by a device may be supplied by one or more power supplies. These power supplies might be voltage regulators such as linear or switching regulators. In a computer system, the motherboard may contain one or more voltage regulators. The voltage regulator may be configured to supply a certain voltage to a device. If a new device, such as a different version of a processor, that requires a different voltage is used in the motherboard, the voltage regulator must be adapted to provide the new voltage. In order to allow handling of disparate device power requirements, the motherboard may have jumpers that allow different voltages to be selected. However, jumpers present several disadvantages, the biggest of which is human error. If the person setting the jumpers has misidentified either the voltage needed or the correct jumpers to select, the wrong voltage will be generated and the device may not function properly. Additionally, jumpers may only facilitate a limited number of options. If no jumper setting can identify the necessary voltage, a new voltage regulator may be required in order to properly power the device.

As a result, some systems allow devices to request voltages from the voltage generator when the system starts up. For example, some systems use VID (voltage identification) codes instead of jumpers to select the voltages generated by the voltage regulators. At startup, the device outputs the VID code correlating to the voltage required. In this way, the device, not the user, controls what voltage it receives. This eliminates the possibility of erroneous voltage selection by the user and, as Table 1 shows, allows the identification of a large number of different voltages.

TABLE 1

Voltage Identification (VID) Codes

| VRM Signal Name | | | | | Processor Core |
|---|---|---|---|---|---|
| VID[4] | VID[3] | VID[2] | VID[1] | VID[0] | Voltage (Vcc) |
| 0 | 0 | 0 | 0 | 0 | 1.850 V |
| 0 | 0 | 0 | 0 | 1 | 1.825 V |
| 0 | 0 | 0 | 1 | 0 | 1.800 V |
| 0 | 0 | 0 | 1 | 1 | 1.775 V |
| 0 | 0 | 1 | 0 | 0 | 1.750 V |
| 0 | 0 | 1 | 0 | 1 | 1.725 V |
| 0 | 0 | 1 | 1 | 0 | 1.700 V |
| 0 | 0 | 1 | 1 | 1 | 1.675 V |
| 0 | 1 | 0 | 0 | 0 | 1.650 V |
| 0 | 1 | 0 | 0 | 1 | 1.625 V |
| 0 | 1 | 0 | 1 | 0 | 1.600 V |
| 0 | 1 | 0 | 1 | 1 | 1.575 V |
| 0 | 1 | 1 | 0 | 0 | 1.550 V |
| 0 | 1 | 1 | 0 | 1 | 1.525 V |
| 0 | 1 | 1 | 1 | 0 | 1.500 V |
| 0 | 1 | 1 | 1 | 1 | 1.475 V |
| 1 | 0 | 0 | 0 | 0 | 1.450 V |
| 1 | 0 | 0 | 0 | 1 | 1.425 V |
| 1 | 0 | 0 | 1 | 0 | 1.400 V |
| 1 | 0 | 0 | 1 | 1 | 1.375 V |
| 1 | 0 | 1 | 0 | 0 | 1.350 V |
| 1 | 0 | 1 | 0 | 1 | 1.325 V |
| 1 | 0 | 1 | 1 | 0 | 1.300 V |
| 1 | 0 | 1 | 1 | 1 | 1.275 V |
| 1 | 1 | 0 | 0 | 0 | 1.250 V |
| 1 | 1 | 0 | 0 | 1 | 1.225 V |
| 1 | 1 | 0 | 1 | 0 | 1.200 V |
| 1 | 1 | 0 | 1 | 1 | 1.175 V |
| 1 | 1 | 1 | 0 | 0 | 1.150 V |
| 1 | 1 | 1 | 0 | 1 | 1.125 V |
| 1 | 1 | 1 | 1 | 0 | 1.100 V |
| 1 | 1 | 1 | 1 | 1 | Shutdown |

Table 1 shows an example of 5-bit VID codes that a device might use to request a particular voltage from a power supply. Each of the 5 bits is sent as a signal to a voltage regulator module (VRM). The VRM is a voltage regulator that is programmed to accept a VID code and to output the voltage corresponding to the particular VID code received. For example, a VRM that received VID code 01011 would output a voltage of 1.575 V. Some computer systems may implement VID codes using more or less than 5 bits in order to accommodate a greater or lesser number of voltages. Additionally, different ranges of voltages might be represented using VID codes.

In computer systems that have several similar devices that perform similar functions, it is possible that some of the devices may request different voltages than others. For example, a multi-processor system may include two different processors and each processor may request a different voltage. In some systems, the devices may share a common voltage supply and consequentially, it may not be possible for each of the them to receive its requested voltage. In systems where each device has a dedicated power supply, if the devices each request different voltages from the power supplies, the power supplies will provide the devices with the different voltages requested. This creates a problem if the system configuration requires that the devices all operate at the same voltage. For example, some components that communicate with multiple processors may not be able to properly recognize signals that are input or output at different voltage levels. If the power supplies in the system supply each processor with its requested voltage, the processors may be operating at different voltage levels, causing their signals to have different voltage levels. This may cause the system to not function properly.

SUMMARY

Various embodiments of a circuit and method for arbitrating voltage requests in a computer system are disclosed. In a first embodiment, one or more devices in a computer system are configured to each assert voltage request. These devices may comprise processors in some embodiments. An arbiter is configured to receive several voltage requests from the devices and to choose a voltage request to output to one or more power supplies. The power supplies are each configured to supply a voltage corresponding to the chosen voltage request to one or more of the devices. This allows all of the devices to receive the same voltage, even if they originally requested different voltages. In some embodiments, the arbiter may choose a voltage request from the voltage requests asserted by the devices. The different voltage requests may comprise VID codes. In some embodiments, the arbiter may include a programmable logic device configured to receive the voltage requests, choose a voltage request and output the chosen voltage request.

If only one device configured to assert a voltage request is present in the system, the arbiter may be configured to choose that device's voltage request. In some embodiments, the arbiter may be configured to receive a low power signal that indicates whether the devices should be in a low power state. The arbiter may be configured to choose a low power voltage request if the low power signal indicates that the devices should be in the low power state. In some embodiments, there may be multiple low power states, so the arbiter may also be configured to receive an additional low power signal. The arbiter may be configured to receive one or more power supply signals indicating whether any of the power supplies are not functioning properly. In certain embodiments, the arbiter may choose a low power voltage request if one of the power supply signals indicates that one of the power supplies is not functioning.

The arbiter may also be configured to receive several signals that indicate whether each of the one or more devices is actually present in the computer system in some embodiments. If none of the devices are present, the arbiter may be configured to choose a low power voltage request. In other embodiments, the arbiter may be configured to choose a voltage request asserted by a device if the signals indicate that device is the only one of the devices present in the computer system.

Another embodiment discloses a method for arbitrating one or more voltage requests in a computer system. One or more voltage requests are asserted by one or more devices configured to receive a voltage. A voltage request is chosen. In some embodiments, the chosen voltage request is selected from the voltage requests asserted by the devices. The chosen voltage request is outputted to one or more voltage regulators. The voltage regulators provide a chosen voltage corresponding to the chosen voltage request to the devices.

In some embodiments, the devices include a processor. The voltage requests may include VID codes in some embodiments.

In another embodiment, a voltage request arbiter is disclosed. The voltage request arbiter has an input stage configured to receive a plurality of voltage requests from a plurality of devices, an arbitration stage configured to choose a chosen voltage request, and an output stage configured to assert the chosen voltage to one or more voltage regulators configured to provide a voltage to one or more of the devices.

Figure 1:
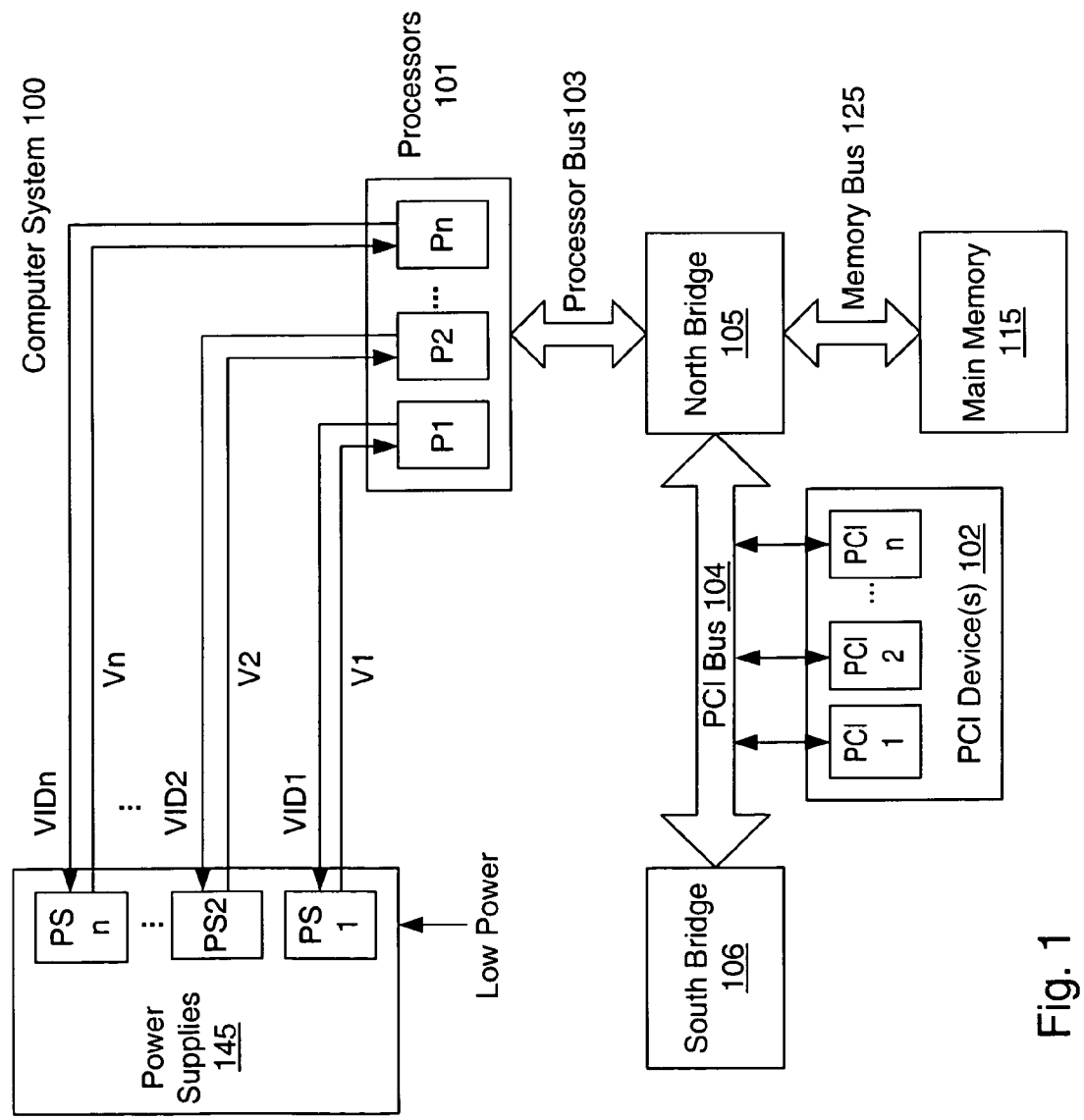
FIG. 1 is a block diagram of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows a computer system 100. The computer system 100 has one or more processors 101 coupled by one or more processor buses (collectively referred to as processor bus 103) to the north bridge 105. The north bridge 105, also known as a system controller, may contain such devices as a memory controller, a Peripheral Component Interconnect (PCI) bus controller, and an Accelerated Graphics Port (AGP). Preferably, the north bridge 105 forwards data, address and control signals between the processor bus, the PCI bus, the AGP and the memory. In order for components such as the north bridge 105 to properly interface with the processors 101, the processors 101 may all need to operate at the same voltage. For example, north bridge 105 may not be able to properly recognize signals at different voltage levels from processors 101. Thus, north bridge 105 may be unable to interface with processors operating at different voltages. The north bridge 105 is coupled to main memory 115 by data and address signals 125. The PCI bus 104 couples the north bridge 105 to the south bridge 106. The south bridge 106, also known as a peripheral bus controller, may contain devices such as a PCI to Industry Standard Architecture (ISA) bridge, an Enhanced Integrated Device Electronics (EIDE) controller, and a Universal Serial Bus (USB) controller. The south bridge 106 may perform administrative functions such as interrupt management, clock/calendar/timer functions, configuration management, power supply control, and power-on signal sequencing. The PCI bus 104 may be connected to one or more PCI devices 102.

Each of the processors 101 may have a separate power supply 145, shown as PS1 through PSn. Each processor outputs its voltage request in the form of a VID code, shown as VID1 through VIDn. Some of the processors 101 may require different voltages than others. If the processors have separate power supplies and the power supplies output the requested voltages, components such as north bridge 105 may not operate properly. Alternately, some embodiments of computer system 100 might have a single power supply for all processors 101. If there is only one power supply and that power supply can only provide a single voltage, it may be impossible to supply each processor with its requested voltage.

Figure 2:
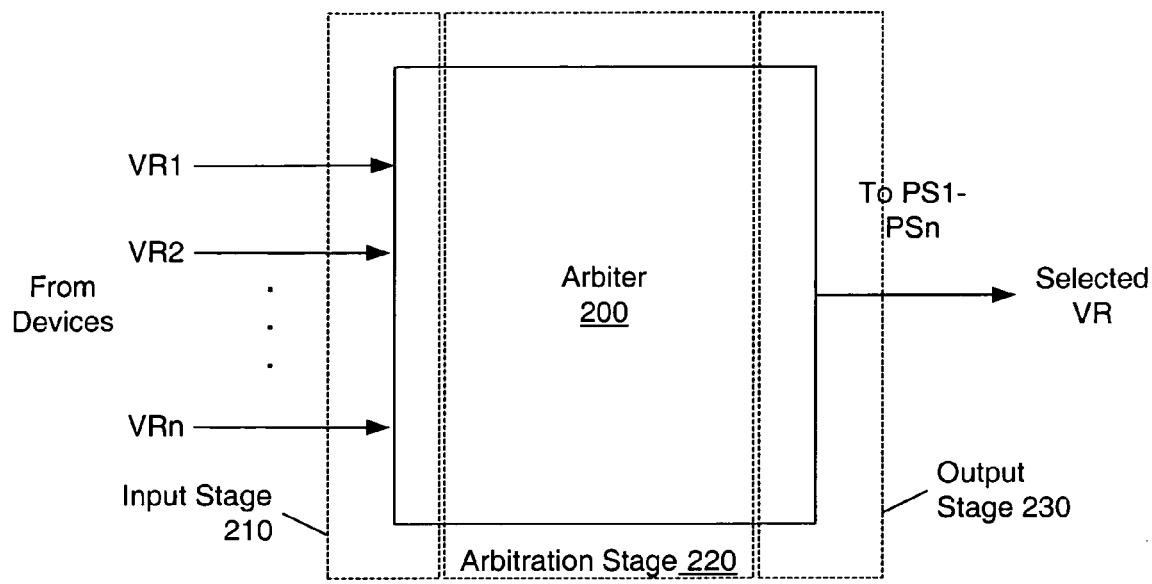
FIG. 2 is a block diagram of an arbiter.

FIG. 2 shows a block diagram of a voltage request arbiter 200. The voltage request arbiter receives voltage requests, shown as VR1–VRn, from several devices, such as processors in an input stage 210. Then, the voltage request arbiter chooses a voltage request in an arbitration stage 220 and outputs the chosen voltage request to the power supplies PS1–PSn in an output stage 230. In some embodiments, there may be only one power supply to which the arbiter outputs the request. In some embodiments, the arbiter may choose a voltage request from the voltage requests asserted by the devices. In other embodiments, the arbiter may be configured to choose a new voltage request based on the voltage requests received. In some embodiments, the devices that assert the different voltage requests may be configured to operate properly at higher voltages but not lower voltages. In these embodiments, the arbiter might be configured to choose the voltage request requesting the highest voltage from the asserted voltage requests. The arbiter is configured to output the chosen voltage request to one or more power supplies that provide a voltage to the devices. This causes all of the devices to receive the same voltage. Devices that are supplied with a higher voltage than requested may require additional cooling. Since all the power supplies powering the devices receive the same voltage request, they supply the same voltage to all of the devices. The devices' requests may take the form of VID codes corresponding to the particular voltage required.

Figure 3:
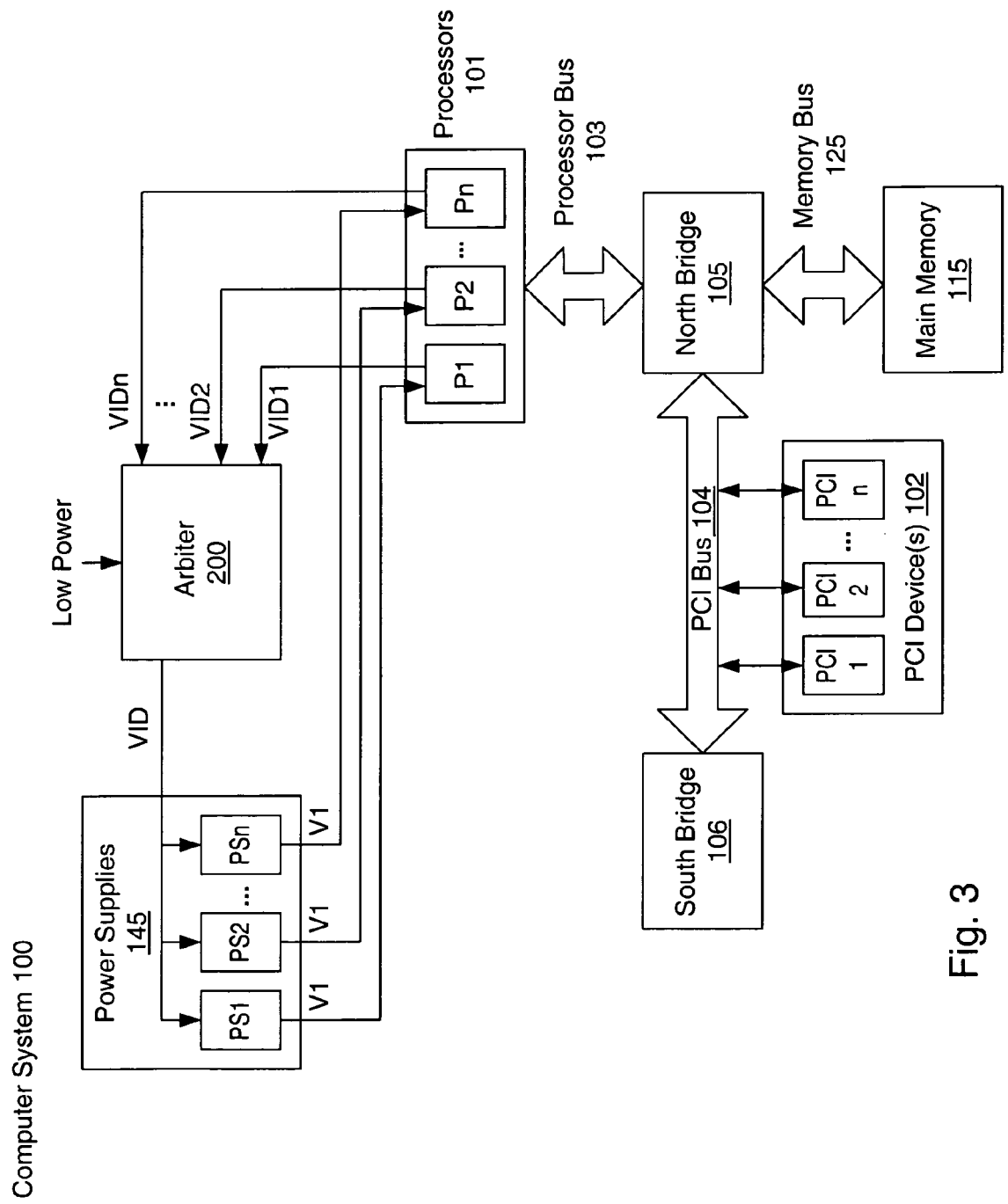
FIG. 3 is a block diagram of a computer system containing an arbiter.

FIG. 3 shows the voltage request arbiter 200 in the computer system 100 from FIG. 1. The arbiter intercepts the individual voltage requests from processors 101 and chooses a single voltage request to output to all of the power supplies 145, labeled PS1–PSn. Now, each power supply PS1–PSn outputs the same voltage V corresponding to the chosen voltage request. As a result, all of the processors 101 operate at the same voltage. This may enable components such as the north bridge 105 to interface with the processors 101 properly.

In some embodiments, a computer system might have power conservation features. If the computer system has one or more low power states, such as standby, sleep or suspend, the system may require that a lower voltage be supplied to various devices. For example, when the computer system is in a normal state, a processor might require a core voltage of 1.9 V. While in one of the low power states, the same processor might receive a core voltage of 1.3 V. Devices other than processors may also need to be provided with different voltages when in low power states. There may be various low power states, and each low power state may have a different associated voltage that needs to be provided to the affected device(s). In order to provide these lower voltages, the voltage regulator generating the core voltage may need to receive voltage requests identifying the low power voltages. When the system exits the low power state, the affected devices' original voltage requests may be reasserted.

Figure 4:
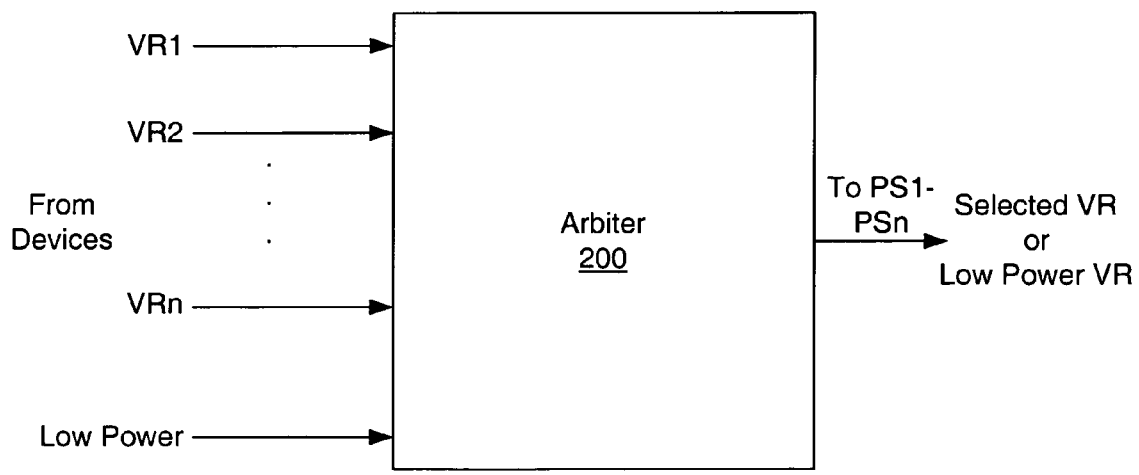
FIG. 4 is block diagram of another embodiment of an arbiter.

FIG. 4 shows one embodiment of arbiter 200 that is configured to function in a computer system having one or more low power states like standby, sleep or suspend. In addition to receiving the devices' voltage requests, the arbiter may also receive one or more low power signal indicating whether the system is in a low power state. In some embodiments, a low power signal may be provided by a component such as a south bridge. When the system is in a low power state, the arbiter may ignore the devices' voltage requests and instead choose a low power voltage request to output to the power supplies. When the system leaves the low power state, the arbiter again chooses a voltage request to output.

Figure 5:
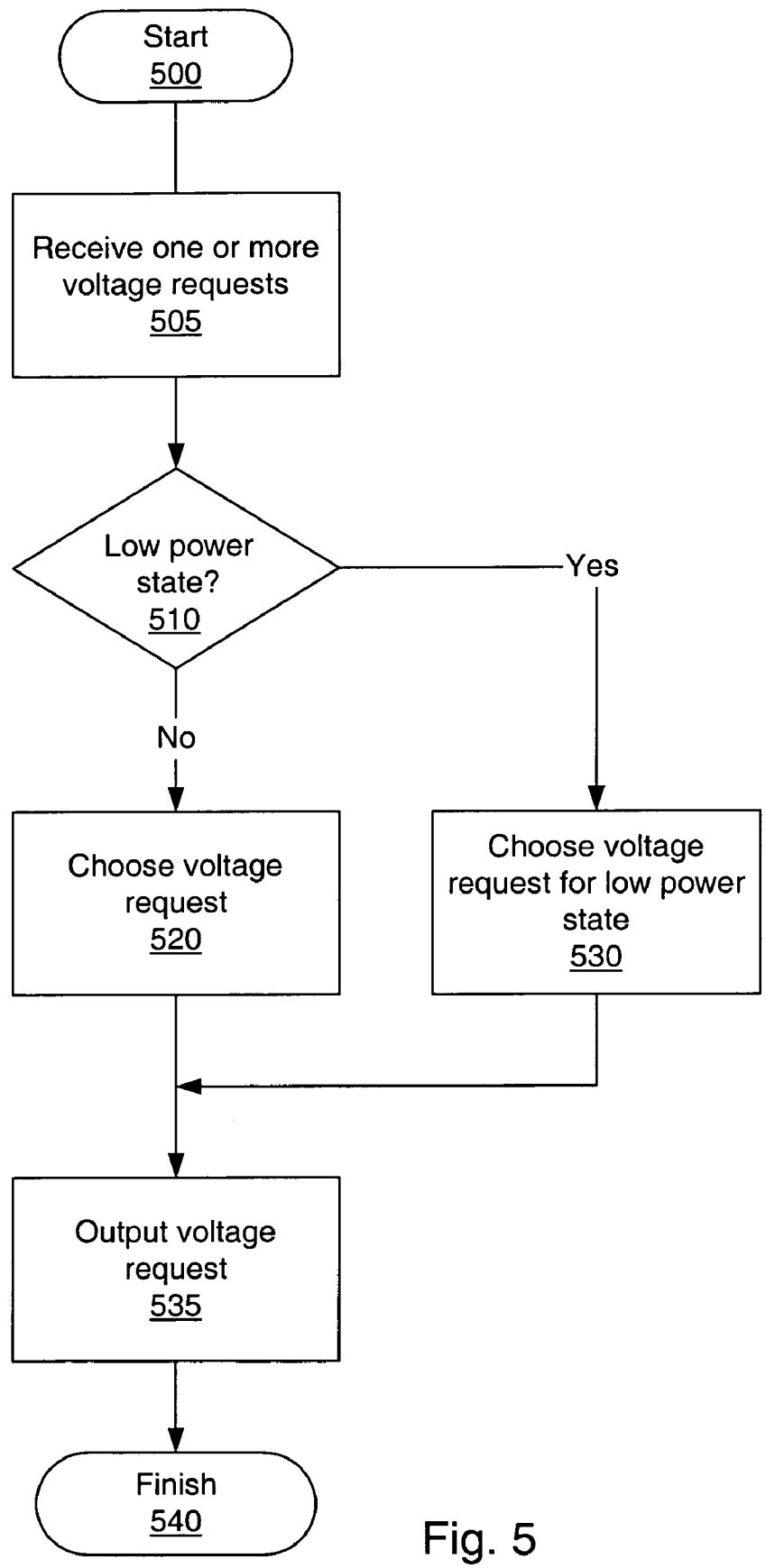
FIG. 5 is a flowchart illustrating one embodiment of a method of arbitrating different voltage requests.

FIG. 5 shows a flow chart according to one embodiment of the invention. Several voltage requests are received at 505. In 510, checking is done to see if the computer system is in a low power state. If so, a voltage request corresponding to the low power state may be chosen, as indicated at 530. For example, if in a low power state, a VID of 10110 that corresponds to a low power voltage of 1.3V might be chosen. If not in a low power state, a non-low voltage state voltage request may be chosen, as indicated at 520. This voltage request may be chosen from one of the voltage requests received in some embodiments. In other embodiments, the chosen voltage request may be a different voltage request than those received.

Figure 6:
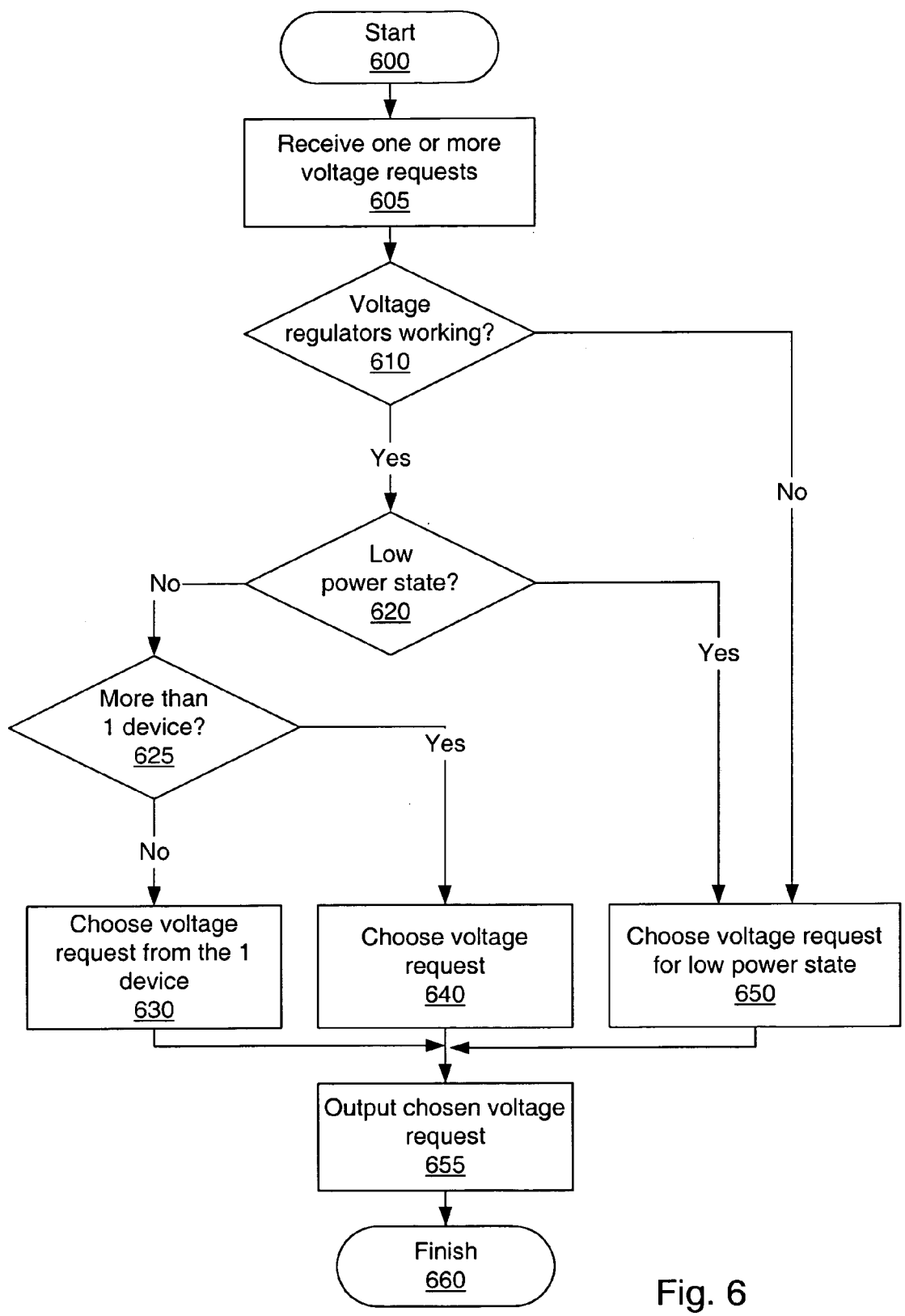
FIG. 6 is a flowchart illustrating a different embodiment of a method of arbitrating different voltage requests.

In FIG. 6, a flow chart illustrates another embodiment of the current invention. Several voltage requests are received at 605. In some embodiments, signals that indicate whether the voltage regulators are operational and signals that indicate which of the devices are present may be received. If a voltage regulator is not operational, it may be unsafe for that voltage regulator to provide a device with its requested voltage. Therefore, a different voltage request than one requested may be output if a voltage regulator is not operational. In 610, some embodiments may determine whether the voltage regulators are working properly. If they are not, a voltage request corresponding to the low power state may be chosen, shown at 650. In some embodiments, the voltage request corresponding to a low power state may be a shutdown voltage request.

If the voltage regulators are working, some embodiments may check to see whether the computer system is asserting a low power state, as shown at 620. If so, in step 650 the voltage request corresponding to the low power state is chosen. In 620, some embodiments may check the signals indicating which of the devices are present. If only one device is present, there is no need for arbitration and that device's voltage request is chosen as indicated at 620 and 630. If more than one device is present, all of the devices' voltage requests may be used to choose a voltage request to output. In some embodiments, the chosen voltage request may be selected from the voltage requests received. For example, in some embodiments, the highest voltage request received may be chosen. Some embodiments may choose a low power voltage request if the signals indicate that none of the devices are present. In step 655, the chosen voltage request is output to one or more power supplies.

Figure 7:
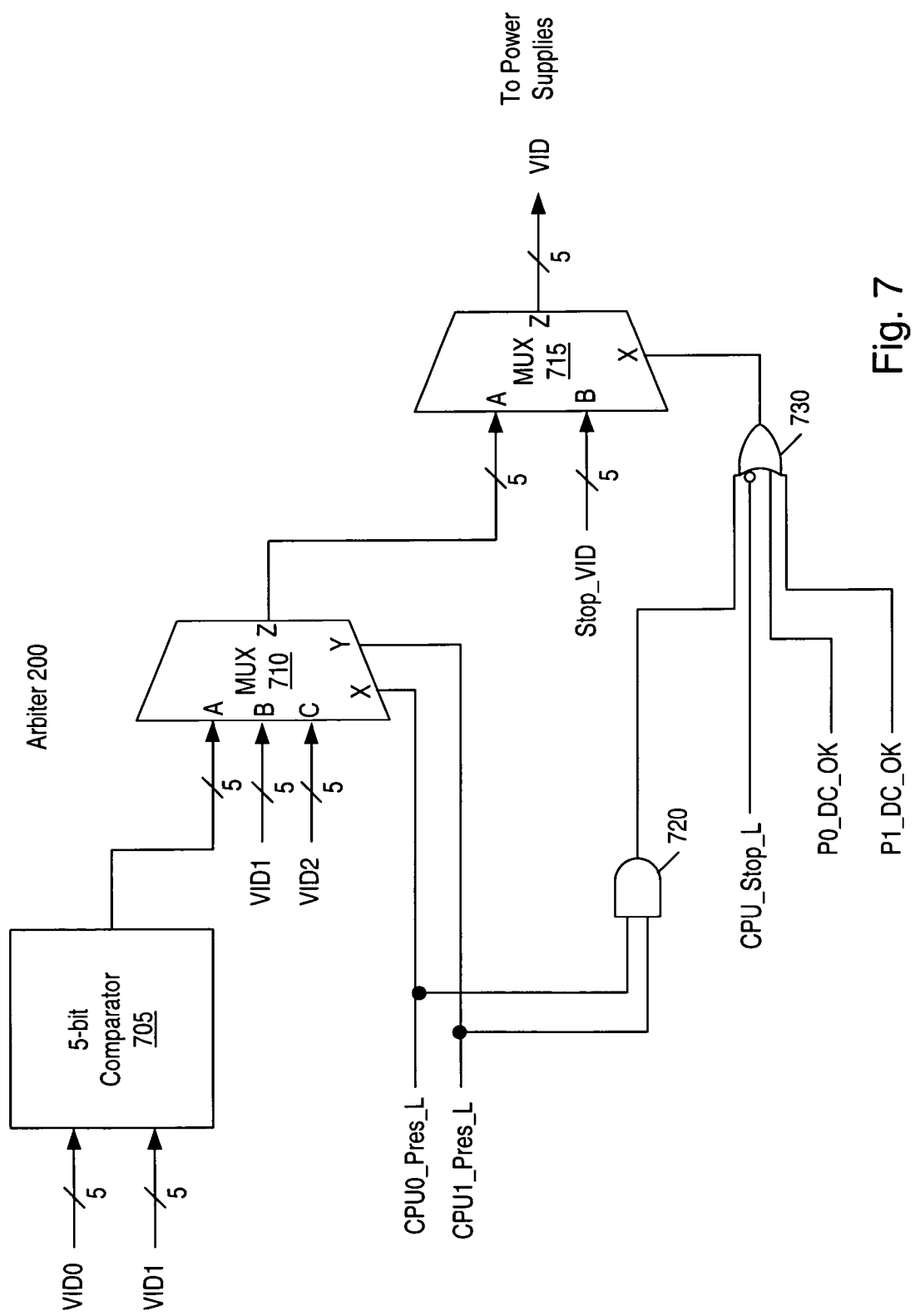
FIG. 7 is a block diagram of another embodiment of an arbiter.

FIG. 7 shows another embodiment of arbiter 200. In one embodiment, the arbiter may be configured to be connected to a dual-processor chipset (not shown). The arbiter may be configured to arbitrate the two possible voltage requests that may be generated by the two processors. These voltage requests might be expressed as VID codes labeled VID0 and VID1. To arbitrate between the requests, the arbiter circuit 700 may select one of them. For example, in some embodiments, the processors may be able to operate at a higher voltage than they request but not at a lower voltage. In these embodiments, the arbiter might determine which VID code represents the highest voltage and selects that VID code using the 5-bit comparator 705. Thus, the comparator may choose the VID code of either VID0 or VID1 depending on which VID code requests the highest voltage. In other embodiments, the arbiter may instead choose a new voltage request that differs from those asserted by the processors.

TABLE 2

Truth Table for MUX 710

| X | Y | Z |
|---|---|---|
| 0 | 0 | A |
| 0 | 1 | C |
| 1 | 0 | B |
| 1 | 1 | x |

Using multiplexer (MUX) 710, the arbiter may determine which, if any, of the processors are present. Table 2 shows a truth table for MUX 710. The active-low signals CPU0_Pres_L and CPU1_Pres_L indicate whether the first and second processors are actually present in the computer system. These two signals may be input as control signals to MUX 710. MUX 710 has three other inputs: VID0 (B), VID1 (C) and the higher of VID0 and VID1 (A). If only one processor is present, there is no need to arbitrate between different voltage requests and the MUX may select that processor's VID code request. If both processors are present, the MUX may instead select the VID code output by the comparator 705.

TABLE 3

Truth Table for MUX 715

| X | Z |
|---|---|
| 0 | A |
| 1 | B |

The arbiter may use MUX 715 to determine whether one of the conditions that might require the arbiter to select the low power state VID code is present. First, the two active-low signals indicating the processors' presence may be ANDed together. If neither processor is present, the output of the AND gate 720 is 1. Then, OR gate 730 may receive as inputs the output of the AND gate 720; an active-low signal CPU_Stop_L, which indicates whether the system is in a low power state; and two signals indicating whether the voltage regulators powering the processors are operating properly, P0_DC_OK and P1_DC_OK. If a power supply is not functioning properly, it may be unsafe to have that power supply provide a high voltage to a processor. Therefore, the arbiter may choose to assert the low power state voltage request if one of the power supplies is not working properly. In other embodiments, the arbiter may instead assert a shutdown voltage request if the power supplies are not operational. In some embodiments, if neither CPU is present, if the system has requested that the processors be put in a low power state, or if one of the power supplies is not functioning properly, OR gate 730 may output a 1. As shown in Table 3, this may cause the MUX 715 to select the VID code corresponding to the lower power state voltage, Stop VID, to output to the processors' power supplies.

If the system has not requested a low power state, at least one processor is present, and both of the processor power supplies are operating satisfactorily, the MUX 715 may output the VID code received from MUX 710. Thus, if more than one processor is present in the system, MUX 715 may output the VID code requesting the higher voltage to the voltage regulators powering the processors. Because the highest VI) code is selected when both processors are present, the processor that requested a lower voltage may have to operate at a higher voltage. As a result, it may be desirable to have more cooling for this processor than it would require if it received the lower voltage it requested. In some embodiments of the invention, this additional cooling is provided. In some embodiments, selecting the lower voltage might result in the processor requesting the higher voltage not functioning properly.

The functionality represented in FIGS. 2–7 might be implemented in many ways. For example, the above circuits might be implemented in a programmable logic device (PLD), such as a PLA (programmable logic array), field programmable gate array (FPGA) or PAL (programmable array logic), or a gate array or application specific integrated circuit (ASIC). Alternately, the arbiter might be implemented in another component of a computer system, such as a north bridge, south bridge, etc.

Figure 8:
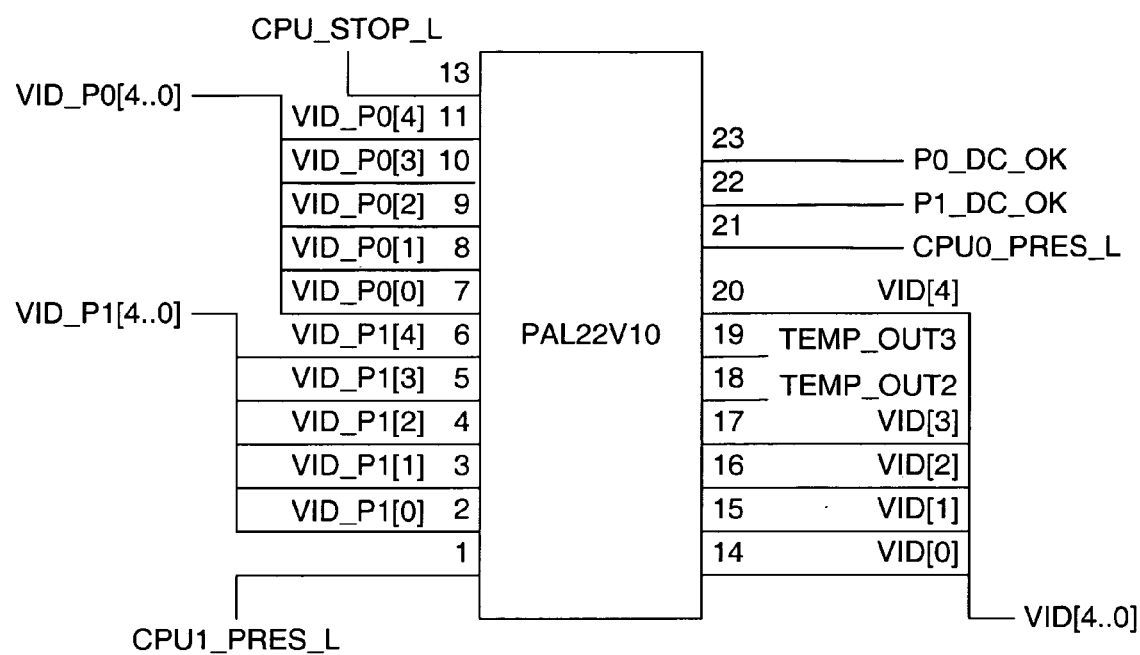
FIG. 8 is a PAL configured according to one embodiment of the invention.

FIG. 8 shows one embodiment of a VID arbiter implemented in a PAL. In this embodiment, the PAL used might be a PAL22V10 device. The PAL22V10 arbiter may be configured to arbitrate between two voltage requests from two processors, P0 and P1, in a computer system. Two active-low signals indicate whether either or both of two CPUs are present and are labeled CPU0_PRES_L and CPU1_PRES_L. In this embodiment, CPU0_PRES_L and CPU1_PRES_L are received at pins 21 and 1 of the PAL22V10. Two other signals, P0_DC_OK and P1_DC_OK, show whether either or both of the power supplies configured to provide voltages to the two processors are working. These signals are received at pins 23 and 22 respectively. An active low signal CPU_STOP_L indicates whether the computer system has requested that the processors be placed in a low power state and is received at pin 13. The voltage request VID_P0[4 . . . 0] from the first processor P0 is received at pins 7–11. The second processor P1's voltage request VID_P1[4 . . . 0] is received at pins 2–6. The voltage request VID[4 . . . 0] chosen by the PAL22V10 arbiter may be output from pins 14,15,16,17 and 20. Pins 18 and 19 may be temporary or intermediate outputs that are used to implement all of the necessary functionality that is required in the PAL22V10 arbiter.

TABLE 4

PAL code for FIG. 8

| | | |
|---|---|---|
| PIN 12 | GND | |
| PIN 24 | VCC | |
| PIN 6..2 | VID_P1[4..0] | COMBINATORIAL; INPUT |
| PIN 11..7 | VID_P0[4..0] | COMBINATORIAL; INPUT |

TABLE 4-continued

PAL code for FIG. 8

```
PIN 22              P1_DC_OK       COMBINATORIAL; INPUT
PIN 23              P0_DC_OK       COMBINATORIAL; INPUT
PIN 1               CPU1PRES_L     COMBINATORIAL; INPUT
PIN 21              CPU0PRES_L     COMBINATORIAL; INPUT
PIN 13              CPUSTOP_L      COMBINATORIAL; INPUT
PIN 20,17,16,15,14  VID[4..0]      COMBINATORIAL; OUTPUT
PIN 19              TEMP_OUT3      COMBINATORIAL
PIN 18              TEMP_OUT2      COMBINATORIAL
STRING OUT9 '(VID_P1[4]*/VID_P0[4])'
STRING OUT8 '(/VID_P1[4]*VID_P0[4])'
STRING OUT7 '(OUT9+(/OUT8*VID_P1[3]*/VID_P0[3]))'
STRING OUT6 '(OUT8+(/OUT9*/VID_P1[3]*VID_P0[3]))'
STRING OUT5 '(OUT7+(/OUT6*VID_P1[2]*/VID_P0[2]))'
STRING OUT4 '(OUT6+(/OUT7*/VID_P1[2]*VID_P0[2]))'
STRING OUT1 '(TEMP_OUT3 +(/TEMP_OUT2*VID_P1[0]*/VID_P0[0]))'
STRING OUT0 '(TEMP_OUT2 +(/TEMP_OUT3*/VID_P1[0]*VID_P0[0]))'
EQUATIONS
TEMP_OUT2 = OUT4+(/OUT5*/VID_P1[1]*VID_P0[1])
TEMP_OUT3 = OUT5+(/OUT4*VID_P1[1]*/VID_P0[1])
CASE (P1_DC_OK,P0_DC_OK,CPUSTOP_L,CPU0PRES_L,CPU1PRES_L)
    BEGIN
        #b11110:
            BEGIN
                VID[4..0] = VID_P1[4..0]
            END
        #b11101:
            BEGIN
                VID[4..0] = VID_P0[4..0]
            END
        #b11100:
            BEGIN
                IF (/OUT1*OUT0) THEN
                    BEGIN
                        VID[4..0] = VID_P1[4..0]
                    END
                ELSE
                    BEGIN
                        VID[4..0] = VID_P1[4..0]
                    END
            END
        OTHERWISE:
            BEGIN
                VID[4..0] = #b10110
            END
END
```

Table 4 shows one embodiment of the arbiter that might be implemented in a PAL such as that shown in FIG. 8. The equations in Table 4 are written in PALASM (TM) (Programmable Array Logic Assembly Language, Monolithic Memories/Advanced Micro Devices, Inc.) convention. The notation +represents the logical OR operation, * represents the logical AND operation, and / represents the NOT operation. The pin assignments shown correspond to the pins in FIG. 8. The equations show how the PAL might operate. For example, when the variables controlling the case statement equal 11110, it means that both power supplies are operating properly (P0_DC_OK= P1_DC_OK=1), the system has not requested that the processors be in a low power state (CPU_STOP_L=1), processor P1 is present (CPU1_PRES_L=0) and processor P0 is not present (CPU0_PRES_L=1). Since only one processor is present and no special circumstances such as a low power state or a non-operational power supply are present, the arbiter chooses the voltage request VID_P1[4 . . . 0] corresponding to the processor P1 and outputs that voltage request as VID[4 . . . 0]. When the case statement variables equal 11101, processor P0 is present and processor P1 is not and the arbiter may choose the voltage request VID_P0[4 . . . 0].

If both processors are present, both power supplies are operating properly, and the system is not requesting a low power state, the case variables are 11100 and the PAL arbiter may use the equations shown in Table 4 to select the higher of the two voltage requests VID0 and VID1. The selected voltage request may then be asserted as VID[4 . . . 0]. If none of the above circumstances are present, the PAL may be configured to output a voltage request corresponding to a low power state. For example, if one of the power supplies does not indicate that it is working properly, the PAL arbiter may be configured to output the voltage request VID 10110, which corresponds to the low power state voltage of 1.3V. In other embodiments, a PAL arbiter might be configured to output a voltage request VID corresponding to a shutdown state if one of the power supplies is not working properly.

Numerous variations and modifications will become apparent to those skilled in the art once the above disclosure is fully appreciated. For example, even though many of the above examples describe situations involving processors, similar situations might arise involving other devices as well. It is intended that the following claims be interpreted to embrace all such variations and modifications.

What is claimed is:

1. A computer system, comprising:
a plurality of devices, each configured to assert a voltage request;
an arbiter configured to receive the voltage requests asserted by the devices, to choose a voltage request and to output the chosen voltage request to one or more power supplies, wherein if any of the voltage requests asserted by the devices specify a voltage that is distinct from the voltage specified by any other of the voltage requests asserted by the devices, the arbiter is configured to choose a highest voltage request from the voltage requests received by the arbiter and to output the chosen voltage request to the one or more power supplies; and
wherein each of the one or more power supplies is configured to receive the chosen voltage request and to provide a voltage that corresponds to the chosen voltage request to the devices such that the devices receive the same supply voltage.

2. The computer system of claim 1, wherein the devices comprise a processor.

3. The computer system of claim 1, wherein each of the voltage requests comprises a voltage identification (VID) code.

4. The computer system of claim 1, wherein if only one device in the computer system is configured to assert a voltage request, the arbiter is further configured to choose that one device's voltage request.

5. The computer system of claim 1, wherein the one or more power supplies comprises one or more voltage regulators.

6. The computer system of claim 1, wherein the arbiter comprises a programmable logic device (PLD) configured to receive the voltage requests, to choose the chosen voltage request and to output the chosen voltage request.

7. A computer system, comprising:
a plurality of devices, each configured to assert a voltage request;
an arbiter configured to receive the voltage requests asserted by the devices, to choose a voltage request and to output the chosen voltage request to one or more power supplies, wherein if any of the voltage requests asserted by the devices specify a voltage that is distinct from the voltage specified by any other of the voltage requests asserted by the devices, the arbiter is configured to choose a voltage request and to output the chosen voltage request to the one or more power supplies; and
wherein each of the one or more power supplies is configured to receive the chosen voltage request and to provide a voltage that corresponds to the chosen voltage request to the devices such that the devices receive the same supply voltage;
wherein the arbiter is further configured to receive a first low power signal indicative of whether the devices should be in a first low power state.

8. The computer system of claim 7, wherein the arbiter is further configured to choose a first low power voltage request corresponding to a first low power state if the first low power signal indicates that the devices should be in the first low power state.

9. The computer system of claim 7, wherein the arbiter is further configured to receive a second low power signal indicative of whether the devices should be in a second low power state.

10. A computer system, comprising:
a plurality of devices, each configured to assert a voltage request;
an arbiter configured to receive the voltage requests asserted by the devices, to choose a voltage request and to output the chosen voltage request to one or more power supplies, wherein if any of the voltage requests asserted by the devices specify a voltage that is distinct from the voltage specified by any other of the voltage requests asserted by the devices, the arbiter is configured to choose a voltage request and to output the chosen voltage request to the one or more power supplies; and
wherein each of the one or more power supplies is configured to receive the chosen voltage request and to provide a voltage that corresponds to the chosen voltage request to the devices such that the devices receive the same supply voltage;
wherein the arbiter is further configured to receive one or more power supply signals indicative of whether the one or more power supplies are functioning properly.

11. The computer system of claim 10, wherein the arbiter is further configured to choose a low power voltage request corresponding to a low power state if any of the power supply signals indicate that any of the power supplies are not functioning properly.

12. A computer system, comprising:
a plurality of devices, each configured to assert a voltage request;
an arbiter configured to receive the voltage requests asserted by the devices, to choose a voltage request and to output the chosen voltage request to one or more power supplies, wherein if any of the voltage requests asserted by the devices specify a voltage that is distinct from the voltage specified by any other of the voltage requests asserted by the devices, the arbiter is configured to choose a voltage request and to output the chosen voltage request to the one or more power supplies; and
wherein each of the one or more power supplies is configured to receive the chosen voltage request and to provide a voltage that corresponds to the chosen voltage request to the devices such that the devices receive the same supply voltage;
wherein the arbiter is further configured to receive a plurality of device present signals indicative of whether each of the devices are present in the computer system.

13. The computer system of claim 12, wherein the arbiter is further configured to choose a low power voltage request corresponding to a low power state if the plurality of device present signals indicate that none of the devices are present.

14. The computer system of claim 12, wherein the arbiter is further configured to choose a first voltage request asserted by a first device if the plurality of device present signals indicate that the first device is the only one of the devices present in the computer system.

15. A computer system, comprising:
a plurality of devices, each configured to assert a voltage request;
an arbiter configured to receive the voltage requests asserted by the devices, to choose a voltage request and to output the chosen voltage request to one or more power supplies, wherein if any of the voltage requests asserted by the devices specify a voltage that is distinct from the voltage specified by any other of the voltage requests asserted by the devices, the arbiter is configured to choose a voltage request and to output the chosen voltage request to the one or more power supplies; and wherein each of the one or more power supplies is configured to receive the chosen voltage request and to provide a voltage that corresponds to the chosen voltage request to the devices such that the devices receive the same supply voltage;

wherein the one or more power supplies comprises one or more voltage regulators, wherein the one or more voltage regulators comprises one or more voltage regulator modules configured to receive a VID code as an input and to provide a corresponding voltage in response to receiving the VID code.

16. A method for arbitrating voltage requests in a computer system, comprising:

asserting the voltage requests from devices each configured to receive a voltage;

receiving the voltage requests;

choosing a voltage request;

outputting the chosen voltage request to one or more voltage regulators;

providing a chosen voltage to the devices from the one or more voltage regulators such that the devices receive the same chosen voltage, wherein the chosen voltage corresponds to the chosen voltage request;

wherein said choosing comprises choosing as a chosen voltage request a highest voltage request from the voltage requests received if any of the voltage requests asserted from the devices specify a voltage that is distinct from the voltage specified by any other of the voltage requests asserted from the devices.

17. The method of claim 16, wherein the devices comprise a processor.

18. The method of claim 16, wherein each of the voltage requests comprises a VID code.

19. The method of claim 16, further comprising:

receiving a voltage request from only one device; and wherein said choosing comprises choosing the voltage request from the one device.

20. A method for arbitrating voltage requests in a computer system, comprising:

asserting the voltage requests from devices each configured to receive a voltage;

receiving the voltage requests;

receiving a first low power signal indicative of whether the devices should be in a first low power state;

choosing a voltage request;

outputting the chosen voltage request to one or more voltage regulators;

providing a chosen voltage to the devices from the one or more voltage regulators such that the devices receive the same chosen voltage, wherein the chosen voltage corresponds to the chosen voltage request;

wherein said choosing comprises choosing a chosen voltage request if any of the voltage requests asserted from the devices specify a voltage that is distinct from the voltage specified by any other of the voltage requests asserted from the devices.

21. The method of claim 20, wherein said choosing further comprises choosing a first low power voltage request corresponding to the first low power state if the first low power signal indicates that the devices should be in the first low power state.

22. The method of claim 20, further comprising receiving a second low power signal indicative of whether the devices should be in a second low power state.

23. A method for arbitrating voltage requests in a computer system, comprising:

asserting the voltage requests from devices each configured to receive a voltage;

receiving the voltage requests;

receiving one or more voltage regulator signals indicative of whether one or more voltage regulators are functioning properly;

choosing a voltage request;

outputting the chosen voltage request to the one or more voltage regulators;

providing a chosen voltage to the devices from the one or more voltage regulators such that the devices receive the same chosen voltage, wherein the chosen voltage corresponds to the chosen voltage request;

wherein said choosing comprises choosing a chosen voltage request if any of the voltage requests asserted from the devices specify a voltage that is distinct from the voltage specified by any other of the voltage requests asserted from the devices.

24. The method of claim 23, wherein said choosing further comprises choosing a low power voltage request corresponding to a low power state if any of the voltage regulator signals indicate that any of the voltage regulators are not functioning properly.

25. A method for arbitrating voltage requests in a computer system, comprising:

asserting the voltage requests from a plurality of devices each configured to receive a voltage;

receiving the voltage requests;

receiving a plurality of device present signals indicative of whether each of the plurality of devices are present in the computer system;

choosing a voltage request;

outputting the chosen voltage request to one or more voltage regulators;

providing a chosen voltage to the devices from the one or more voltage regulators such that the devices receive the same chosen voltage wherein the chosen voltage corresponds to the chosen voltage request;

wherein said choosing comprises choosing a chosen voltage request if any of the voltage requests asserted from the devices specify a voltage that is distinct from the voltage specified by any other of the voltage requests asserted from the devices.

26. The method of claim 25, wherein said choosing further comprises choosing a low power voltage request corresponding to a low power state if the plurality of device present signals indicate that none of the devices are present.

27. The method of claim 25, wherein said choosing further comprises choosing a first voltage request asserted by a first device if the plurality of device present signals indicate that the first device is the only one of the devices present in the computer system.

28. A voltage request arbiter, comprising:

an input stage configured to receive a plurality of voltage requests from a plurality of devices; and an arbitration stage coupled between the input stage and an output stage, wherein the arbitration stage is configured to chose a voltage request, wherein if any of the plurality of voltage requests specify a voltage that is distinct from the voltage specified by any other of the plurality of voltage requests, the arbitration stage is configured to choose as a chosen voltage request a highest voltage request from the voltage requests from the devices; and the output stage configured to assert the chosen voltage request to one or more voltage regulators that provide one or more of the devices with a chosen voltage specified by the chosen voltage request such that the devices receive the same chosen voltage.

29. The voltage request arbiter of claim 28, wherein each of the voltage requests comprises a VID code.

30. A voltage request arbiter, comprising:
an input stage configured to receive a plurality of voltage requests from a plurality of devices, wherein the input stage is further configured to receive a first low power signal indicative of whether the devices should be in a first low power state; and
an arbitration stage coupled between the input stage and an output stage, wherein the arbitration stage is configured to chose a voltage request, wherein if any of the plurality of voltage requests specify a voltage that is distinct from the voltage specified by any other of the plurality of voltage requests, the arbitration stage is configured to choose a chosen voltage request; and
the output stage configured to assert the chosen voltage request to one or more voltage regulators that provide one or more of the devices with a chosen voltage specified by the chosen voltage request such that the devices receive the same chosen voltage.

31. The voltage request arbiter of claim 30, wherein the arbitration stage is further configured to choose a first low power voltage request corresponding to a first low power state if the first low power signal indicates that the devices should be in the first low power state.

32. The voltage request arbiter of claim 30, wherein the input stage is further configured to receive a second low power signal indicative of whether the devices should be in a second low power state.

33. A voltage request arbiter, comprising:
an input stage configured to receive a plurality of voltage requests from a plurality of devices, wherein the input stage is further configured to receive one or more voltage regulator signals indicative of whether one or more voltage regulators are functioning properly; and
an arbitration stage coupled between the input stage and an output stage, wherein the arbitration stage is configured to chose a voltage request, wherein if any of the plurality of voltage requests specify a voltage that is distinct from the voltage specified by any other of the plurality of voltage requests, the arbitration stage is configured to choose a chosen voltage request; and
the output stage configured to assert the chosen voltage request to one or more of the voltage regulators that provide one or more of the devices with a chosen voltage specified by the chosen voltage request such that the devices receive the same chosen voltage.

34. The voltage request arbiter of claim 33, wherein the arbitration stage is further configured to choose a low power voltage request corresponding to a low power state if any of the voltage regulator signals indicates that any of the voltage regulators are not functioning properly.

35. A voltage request arbiter, comprising:
an input stage configured to receive a plurality of voltage requests from a plurality of devices, wherein the input stage is further configured to receive a plurality of device present signals indicative of whether the plurality of devices is present; and
an arbitration stage coupled between the input stage and an output stage, wherein the arbitration stage is configured to chose a voltage request, wherein if any of the plurality of voltage requests specify a voltage that is distinct from the voltage specified by any other of the plurality of voltage requests, the arbitration stage is configured to choose a chosen voltage request; and
the output stage configured to assert the chosen voltage request to one or more voltage regulators that provide one or more of the devices with a chosen voltage specified by the chosen voltage request such that the devices receive the same chosen voltage.

36. The voltage request arbiter of claim 35, wherein the arbitration stage is further configured to choose a low power voltage request corresponding to a low power state if the plurality of device present signals indicate that none of the devices are present.

37. The voltage request arbiter of claim 35, wherein the arbitration stage is further configured to choose a first voltage request from a first device if the plurality of device present signals indicate that the first device is the only one of the devices present.

* * * * *